United States Patent [19]

Lee et al.

[11] Patent Number: 5,164,478
[45] Date of Patent: Nov. 17, 1992

[54] PROCESS FOR PRODUCING POLYARYLATE HAVING LOW COLOR

[75] Inventors: Cherylyn Lee, Fanwood; Larry F. Charbonneau, Mendham; Gordon W. Calundann, North Plainfield, all of N.J.

[73] Assignee: Hoechst Celanese Corp., Somerville, N.J.

[21] Appl. No.: 744,604

[22] Filed: Aug. 13, 1991

[51] Int. Cl.⁵ .................... C08F 6/00; C08G 63/02; C08G 63/18
[52] U.S. Cl. .................... 528/481; 528/176; 528/193; 528/194; 528/480
[58] Field of Search ............ 528/176, 193, 194, 480, 528/481

[56] References Cited

U.S. PATENT DOCUMENTS

| | | | |
|---|---|---|---|
| 4,485,230 | 11/1984 | Yu | 528/125 |
| 4,533,720 | 8/1985 | Yu | 528/125 |
| 4,937,319 | 6/1990 | Gupta et al. | 528/180 |
| 4,994,546 | 2/1991 | Stern et al. | 528/194 |
| 5,004,796 | 4/1991 | Vicari et al. | 528/179 |
| 5,070,176 | 12/1991 | Strand | 528/194 |

Primary Examiner—John Kight, III
Assistant Examiner—T. Mosley
Attorney, Agent, or Firm—Joseph M. Mazzarese

[57] ABSTRACT

A process for preparing polyarylates having low color wherein isophthalic acid, terephthalic acid, and bisphenol A are melt polymerized to form a prepolymer, the prepolymer is crystallized, and then further polymerized in the solid state by heating under an inert gas flow, e.g. nitrogen. Crystallization is accomplished by adding the amorphous prepolymer in powder or pellet form to a organic crystallizing medium such as 2-ethoxyethyl acetate or hexyl acetate. This process produces a polymer having low color content. The crystallized polymer may be made amorphous by melting. This amorphous polymer is useful in applications requiring a transparent, colorless plastic.

19 Claims, No Drawings

PROCESS FOR PRODUCING POLYARYLATE HAVING LOW COLOR

BACKGROUND OF THE INVENTION

This invention relates to the field of processes for producing wholly aromatic polyesters, or polyarylates, especially such polymers having low color.

Aromatic polyesters have many well-known uses. One use for these materials is as a transparent material; ideally, the material should be color-free as well. An amorphous polymer is required for high transparency materials because crystalline polymers have poor transparency.

Amorphous polyesters are commonly made by melt polymerization, which requires high temperatures. Unfortunately, these high temperatures cause undesirable coloration of the material if maintained for a long period of time, but if the polymerization is abbreviated to avoid significant color formation the polymer will have a low viscosity and molecular weight and will not exhibit acceptable physical properties.

U.S. Pat. No. 3,684,766 discloses a process for enhancing the inherent viscosity of bisphenol polyesters wherein isophthalic acid and terephthalic acid units are copolymerized with bisphenol A and the resulting polyester is contacted with a crystallizing medium and heated to produce a polyester having an inherent viscosity of 0.5 or more. This reference teaches how to make bisphenol A polyesters containing terephthalic acid and isophthalic acid monomers in a mole ratio of between 50:50 and 70:30, respectively, but teaches that a polymer having a higher proportion of isophthalic acid cannot be crystallized sufficiently to produce a high viscosity polymer. U.S. Pat. No. 3,780,148 is a continuation-in-part of the '766 patent.

A process for preparing partially aromatic polyesters is disclosed in U.S. Pat. No. 3,972,852: aromatic dicarboxylic acids and aliphatic diols are polymerized in two stages, in a melt and then in the solid state. The polymer may be heat treated or treated with a crystallizing solvent between the melt polymerization step and the solid state polymerization step.

U.S. Pat. No. 4,314,051 describes a process for preparing polyarylates comprising forming a crystalline prepolymer and then heating below the prepolymer melting point to form a crystalline polyarylate having a viscosity of 0.45 to 1.2 dl/g.

A wholly aromatic copolyester and a process therefor is taught by U.S. Pat. No. 4,436,894. In this process, a copolyester composed primarily of isophthalic acid units and hydroquinone units is made by polycondensing the monomers under heat until the viscosity reaches 0.2 and then continuing the polymerization in a molten state at a temperature below the crystalline melting point of the polymer.

U.S. Pat. No. 4,994,546 teaches a process for preparing bisphenol polyarylates wherein a prepolymer is formed from bisphenol A and at least one aromatic dicarboxylic acid and the prepolymer is polycondensed under agitation to form a powdery solid which is further polymerized until the desired molecular weight is reached.

Japanese Pat. No. 53054295 (1978) discloses polyesters comprising mainly the ester unit of aromatic dicarboxylic acids and 2,2-bis(4'-hydroxyphenyl)propane produced by allowing amorphous polyester to stand in contact with a crystallization media until the surface of the polyester particles is partly crystallized and then polymerizing further in the solid state.

SUMMARY OF THE INVENTION

The present invention is a process for making a polymer having low color consisting essentially of monomer units derived from isophthalic acid, terephthalic acid and bisphenol A (2,2-bis(4'-hydroxyphenyl)propane). Half of the monomers are bisphenol A and half are a mixture of isophthalic acid and terephthalic acid in a mole ratio of about 75:25. The process comprises: melt polymerizing the monomers to form an amorphous prepolymer having an intrinsic viscosity ("IV") of approximately 0.2-0.5 dl/g, preferably about 0.3-0.45 dl/g; exposing the prepolymer to a liquid organic crystallizing medium, such as 2-ethoxyethyl acetate or hexyl acetate, until crystallization occurs; isolating and drying the crystallized prepolymer; and heating the crystallized prepolymer under a dry, oxygen-free inert gas flow (e.g., nitrogen) until the IV reaches about 0.6 or more. The polymer may then be melted to return it to an amorphous state.

It is an object of the present invention to provide a process for making a transparent, relatively color-free polyarylate.

It is another object of this invention to provide a transparent, relatively color-free polyester made from bisphenol A, isophthalic acid, and terephthalic acid.

Other objects of the present invention will be apparent to those skilled in the art from the detailed description of the invention provided herein.

DETAILED DESCRIPTION OF THE PREFERRED EMBODIMENTS

In one preferred embodiment of the process of the present invention, acetic anhydride, bisphenol A (2,2-bis(4'-hydroxyphenyl)propane), isophthalic acid, and terephthalic acid are combined in the respective mole ratios of about 200:100:75:25. To this mixture is added about 26% by weight of Dowtherm A (an inert mixing medium comprising a eutectic mixture of biphenyl and diphenyl ether, commercially available from Dow Corp.), and about 25 ppm Li$^+$ in the form of LiOH.

This admixture is stirred and heated for several hours, preferably about 6 hours, in an inert atmosphere, e.g. nitrogen or a noble gas, up to a temperature of about 300° C. to form an amorphous prepolymer having an intrinsic viscosity of about 0.2-0.5 dl/g, preferably about 0.3-0.45 dl/g.

Preferably, the heating is done in stages; first temperatures of about 125°-150° C. are used to promote acetylation of the bisphenol A by the acetic anhydride, then temperatures of about 280°-320° C. are used to effect polymerization. The polymerization is conducted under a partial vacuum for the last 10-60 minutes at 280°-320° C.; a longer time period produces a higher molecular weight prepolymer. Desirably, the polymerization is stopped when the intrinsic viscosity reaches about 0.45 dl/g.

The prepolymer is cooled and ground into powder, or alternatively extruded and formed into small pellets. These particles are now immersed in a crystallizing medium comprising hexyl acetate or 2-ethoxyethyl acetate.

The crystallizing medium may be any liquid that will promote crystallization, but not significantly dissolve the prepolymer. As a practical matter, it is desirable to choose a medium having a boiling point high enough to allow the crystallization to be done at an elevated temperature, i.e. above 100° C., to accelerate the process, but low enough to make it easy to drive off traces of the medium during the subsequent drying phase. A suitable boiling point is generally in the range of 150°-200° C. Generally, organic compounds such as 2-ethoxyethyl acetate, hexyl acetate, ethyl acetate, acetone, toluene, methyl ethyl ketone, butyronitrile, or combinations thereof, or the like, are useful crystallization media. In the practice of the present invention, it is preferred to use hexyl acetate or 2-ethoxyethyl acetate, preferably at temperatures in the approximate range of 130°-150° C.

The optimum temperature and time used for crystallization will depend upon the choice of the medium; typically about 2-3 hours or more are needed at temperatures of about 130°-150° C. It is understood that the crystallization may be done at lower temperatures; however, much more time will be needed. During this procedure, low molecular weight oligomers may dissolve in the medium, causing a reduction in the amount of prepolymer. It has been found that this loss is minimized when the prepolymer has an IV in the higher portion of the preferred range, i.e. about 0.45 dl/g.

The crystallized prepolymer is separated from the medium and dried. The prepolymer is then further polymerized in the solid state by heating under a dry, oxygen-free, inert atmosphere, such as nitrogen. Generally, the prepolymer is heated to about 180°-230° C. for several hours until an IV of about 0.6 dl/g is achieved. Preferably, the heating is done in stages; the heating is done first at about 180°-200° C., then at about 225° C.

The yellowness index of the polymer can be determined on compression molded disks (2" diameter, 1/16" thickness) using a Hunter Lab D-25 Optical Sensor Colorimeter. Using this Hunter Yellowness Index, the color of different polymer samples may be readily compared and evaluated.

An IV lower than 0.6 dl/g is not desirable because of the low molecular weight and accompanying poor physical properties of such a polymer, whereas a much higher IV is impractical because the polymer becomes too viscous to process easily.

The polymer is ultimately melted and cooled to destroy its crystallinity. The result is a low-color, transparent, amorphous polymer with good physical properties.

The relative mole ratios of the acids may be varied; a ratio of isophthalic acid to terephthalic acid in the approximate range of 85:15 to 15:85, and especially 75:25 to 50:50, is suitable for producing an amorphous polymer according to the present invention. A mole ratio of 75:25 is preferred.

Crystallinity is a somewhat relative term for a polymer. However, for the purposes of the present invention, the polymer may be considered crystalline when its glass transition, as observed by DSC at 20° C./min., is not readily detectable, and an endothermic melting transition is present. The crystalline polymer also looks different: it is opaque, while a pure amorphous polymer of this invention typically is transparent.

The following non-limiting Example illustrates several embodiments of the invention:

EXAMPLE

The following ingredients were combined in a reaction vessel equipped with a C-shaped Hastaloy stirrer, a glass inlet tube, a thermocouple, and a Vigreux column attached to a condenser and receiver:

bisphenol A 456.0 grams (2.0 moles);
isophthalic acid 249.0 grams (1.5 moles);
terephthalic acid 83.0 grams (0.5 mole).

The flask was immersed in a sand bath and purged of oxygen by evacuation and flushing with nitrogen three times. To this flask were added 420.3 g (4.1 moles) of acetic anhydride, 430 g of Dowtherm A, and 2.2 ml of a 3.1% (w/v) solution of lithium hydroxide in acetic acid (16 ppm Li+) as catalyst. The mixture was stirred and heated rapidly to 125° C. under a dry nitrogen atmosphere. In 80 minutes the temperature was raised to 150° C. and then slowly raised to 280° C. over a period of 200 minutes, to produce the desired prepolymer. Dowtherm A and acetic acid co-distilled during the heating. The flask was evacuated to a pressure of less than 1.0 mm Hg at 280° C. The prepolymer was stirred at 280° C. As the polymerization progressed, the viscosity increased, and a greater amount of torque (or applied voltage) was needed to maintain a constant stirring speed. The stirring continued until a change in torque equivalent to 45 mv was achieved.

A solid, transparent, amorphous prepolymer formed from the bisphenol A, isophthalic acid, and terephthalic acid monomers was observed in the reaction vessel. The prepolymer was cooled and ground into a powder. The prepolymer had an inherent viscosity of 0.32 dl/g and a Hunter Yellowness Index of 7.3 units as measured on a compression molded disk (1/16" thick).

A 70 g portion of prepolymer powder was added to about 1 liter of 2-ethoxyethyl acetate and heated for 2.5 hours at 150° C., causing the prepolymer to become opaque and crystalline. The prepolymer was then separated from the acetate and dried.

The crystallized prepolymer was heated in the solid state under a dry nitrogen atmosphere. In the first heating stage, the temperature reached 180°-200° C. for 2 hours; in the second heating stage, a temperature of 225° C. was maintained for 5 hours. This polymer had an inherent viscosity of 0.56 dl/g and a Hunter Yellowness Index of 9.6 units as measured on a compression molded disk (1/16" thick).

The polymer was later melted and cooled, resulting in a transparent, amorphous polymer having low color.

Many variations of the present invention will occur to those skilled in the art from the preceding description and examples. The scope of the invention is not limited to the embodiments illustrated herein, but includes all the subject matter within the scope of the appended claims.

We claim:

1. A process for making a polymer having low color that consists essentially of monomer units derived from isophthalic acid, terephthalic acid and 2,2-bis(4'-hydroxyphenyl)propane monomers, said process comprising the steps of:

combining said monomers in amounts such that there is approximately one mole of said 2,2-bis(4'-hydroxyphenyl)propane for each mole of said acid monomers and the mole ratio of isophthalic acid to terephthalic acid is about 75:25;

melt polymerizing said monomers to form an amorphous prepolymer having an intrinsic viscosity of approximately 0.2-0.5 dl/g;

immersing said prepolymer in a liquid organic crystallizing medium at a temperature below the boiling point of said medium for a time sufficient to crystallize said prepolymer;

separating said crystallized prepolymer from said medium;

drying said crystallized prepolymer; and, heating said crystallized prepolymer under a dry, oxygen-free inert gas flow until the intrinsic viscosity of the polymer reaches at least about 0.6 dl/g.

2. A process according to claim 1 wherein acetic anhydride is combined with said monomers prior to said melt polymerization.

3. A process according to claim 1 further comprising the step of melting said polymer having an intrinsic viscosity of at least about 0.6 dl/g to eliminate the crystallinity thereof.

4. A process according to claim 1 wherein said amorphous prepolymer is ground into a powder prior to being immersed in said crystallizing medium.

5. A process according to claim 1 wherein said amorphous prepolymer is extruded and formed into pellets prior to being immersed in said crystallizing medium.

6. A process according to claim 1 wherein in said heating step said crystallized prepolymer is heated to temperatures in the approximate range of 180°–230° C.

7. A process according to claim 1 wherein said prepolymer has an intrinsic viscosity of about 0.3–0.45 dl/g.

8. A process according to claim 1 wherein said prepolymer has an intrinsic viscosity of about 0.45 dl/g.

9. A process according to claim 1 wherein said crystallizing medium comprises hexyl acetate or 2-ethoxyethyl acetate.

10. A polymer made by the process of claim 9.

11. A polymer made by the process of claim 1.

12. A process for making a polymer having low color that consists essentially of monomer units derived from isophthalic acid, terephthalic acid and 2,2-bis(4'-hydroxyphenyl)propane monomers, said process comprising the steps of:

combining said monomers with acetic anhydride in amounts such that there is approximately one mole of said 2,2-bis(4'-hydroxyphenyl)propane for each mole of said acid monomers, the mole ratio of isophthalic acid to terephthalic acid is about 75:25, and there are about two moles of acetic anhydride for each mole of 2,2-bis(4'-hydroxyphenyl)propane;

melt polymerizing said monomers to form an amorphous prepolymer having an intrinsic viscosity of approximately 0.3–0.45 dl/g;

immersing said prepolymer in a liquid organic crystallizing medium at a temperature below the boiling point of said medium for a time sufficient to crystallize said prepolymer;

separating said crystallized prepolymer from said medium;

drying said crystallized prepolymer;

heating said crystallized prepolymer under a dry, oxygen-free inert gas flow in the approximate temperature range of 180°–230° C. until the intrinsic viscosity of the polymer reaches at least about 0.6 dl/g; and, melting said polymer having an intrinsic viscosity of at least about 0.6 dl/g to eliminate the crystallinity thereof.

13. A process according to claim 12 wherein said crystallization medium comprises hexyl acetate or 2-ethoxyethyl acetate and said crystallizing medium is stirred and maintained at a temperature of about 130°–150° C. during said prepolymer crystallization step.

14. A polymer made according to the process of claim 13.

15. A polymer made according to the process of claim 12.

16. A process for making a polymer having low color that consists essentially of monomer units derived from isophthalic acid, terephthalic acid and 2,2-bis(4'-hydroxyphenyl)propane monomers, said process comprising the steps of:

combining said monomers in amounts such that there is approximately one mole of said 2,2-bis(4'-hydroxyphenyl)propane for each mole of said acid monomers and the mole ratio of isophthalic acid to terephthalic acid is about 50:50 and 75:25;

melt polymerizing said monomers to form an amorphous prepolymer having an intrinsic viscosity of approximately 0.2–0.5 dl/g;

immersing said prepolymer in a liquid organic crystallizing medium at a temperature below the boiling point of said medium for a time sufficient to crystallize said prepolymer;

separating said crystallized prepolymer from said medium;

drying said crystallized prepolymer; and, heating said crystallized prepolymer under a dry, oxygen-free inert gas flow until the intrinsic viscosity of the polymer reaches at least about 0.6 dl/g.

17. A process according to claim 16 wherein said heating step said crystallized prepolymer is heated to temperatures in the approximate range of 180°–230° C.

18. A process according to claim 16 wherein said prepolymer has an intrinsic viscosity of about 0.3–0.45 dl/g.

19. A process according to claim 16 wherein said crystallizing medium comprises hexyl acetate or 2-ethoxyethyl acetate.

* * * * *